United States Patent
Geiger

(10) Patent No.: US 12,399,031 B2
(45) Date of Patent: Aug. 26, 2025

(54) MAPPING METHOD FOR AUTONOMOUS VEHICLES

(71) Applicant: Simon Geiger, Saitama (JP)

(72) Inventor: Simon Geiger, Saitama (JP)

(73) Assignee: Volvo Autonomous Solutions AB, Gothenburg (SE)

( * ) Notice: Subject to any disclaimer, the term of this patent is extended or adjusted under 35 U.S.C. 154(b) by 218 days.

(21) Appl. No.: 18/002,965

(22) PCT Filed: Jun. 30, 2020

(86) PCT No.: PCT/JP2020/025711
§ 371 (c)(1),
(2) Date: Dec. 22, 2022

(87) PCT Pub. No.: WO2022/003838
PCT Pub. Date: Jan. 6, 2022

(65) Prior Publication Data
US 2023/0243666 A1    Aug. 3, 2023

(51) Int. Cl.
*G05D 1/00* (2024.01)
*G01C 21/00* (2006.01)

(52) U.S. Cl.
CPC ..... *G01C 21/3852* (2020.08); *G01C 21/3807* (2020.08); *G05D 1/0088* (2013.01); *G05D 1/0274* (2013.01)

(58) Field of Classification Search
CPC ............ G01C 21/3852; G01C 21/3807; G05D 1/0088; G05D 1/0274
See application file for complete search history.

(56) References Cited

U.S. PATENT DOCUMENTS 9,129,355 B1     9/2015  Harvey et al.
10,921,128 B2 *  2/2021  Kuzmanovic ........ G08G 5/0069
                          (Continued)

FOREIGN PATENT DOCUMENTS

CN     104977012 A     10/2015
CN     107533811 A      1/2018
                (Continued)

OTHER PUBLICATIONS

Extended European Search Report dated Feb. 27, 2024 in corresponding European Patent Application No. 20942861.4, 7 pages.
(Continued)

*Primary Examiner* — Navid Z. Mehdizadeh
*Assistant Examiner* — Matthew Ho
(74) *Attorney, Agent, or Firm* — Venable LLP; Jeffri A. Kaminski

(57) ABSTRACT

When an autonomous vehicle plans a new drive mission in a confined area, a first set of environmental information, and after a time interval, a second set of environmental information, are obtained by a device flying above a confined area including the departure point and the destination point of the vehicle, each set of environmental information including locations and geometries of objects in the confined area. Then, an object that is present at the same location in the first set of environmental information and in the second set of environmental information is classified as a semi-static object, and an object that is present at different locations in the first set of environmental information and in the second set of environmental information is classified as a dynamic object. A map including location and geometry of each object classified as a semi-static object is then created.

11 Claims, 16 Drawing Sheets

(56) References Cited

U.S. PATENT DOCUMENTS

| | | | |
|---|---|---|---|
| 10,977,800 B1* | 4/2021 | Hay | G06T 3/4053 |
| 2009/0226094 A1* | 9/2009 | Yamazaki | G06T 7/74 |
| | | | 382/254 |
| 2017/0307751 A1 | 10/2017 | Rohani et al. | |
| 2018/0196438 A1 | 7/2018 | Newlin et al. | |
| 2020/0072613 A1 | 3/2020 | Kuzmanovic | |
| 2021/0174669 A1* | 6/2021 | Guan | G06N 3/08 |

FOREIGN PATENT DOCUMENTS

| | | | |
|---|---|---|---|
| CN | 109146943 A | 1/2019 |
| CN | 109282821 A | 1/2019 |
| CN | 109540125 A | 3/2019 |
| CN | 109703607 A | 5/2019 |
| CN | 109726640 A | 5/2019 |
| CN | 109782766 A | 5/2019 |
| CN | 109840462 A | 6/2019 |
| CN | 109844671 A | 6/2019 |
| CN | 110349420 A | 10/2019 |
| CN | 110958567 A | 4/2020 |
| EP | 3346347 A1 | 7/2018 |
| GB | 2558255 A | 7/2018 |
| JP | 2017049172 A | 3/2017 |
| JP | 2017174032 A | 9/2017 |
| JP | 2017215940 A | 12/2017 |
| JP | 201928807 A | 2/2019 |
| KR | 20180109455 A | 10/2018 |

OTHER PUBLICATIONS

International Search Report and Written Opinion of the International Searching Authority in corresponding International Application No. PCT/JP2020/025711 mailed Sep. 29, 2020 (6 pages).

Chinese Office Action dated Nov. 22, 2024 in corresponding Chinese Patent Application No. 202080102565.4, 20 pages.

* cited by examiner

MAPPING METHOD FOR AUTONOMOUS VEHICLES

CROSS-REFERENCE TO RELATED APPLICATIONS

This application is a U.S. National Stage application of PCT/JP2020/025711, filed Jun. 30, 2020 and published on Jan. 6, 2022, as WO 2022/003838, all of which is hereby incorporated by reference in its entirety.

TECHNICAL FIELD

The present invention relates to methods, devices, computer programs, and computer readable media, for mapping areas in which autonomous vehicles drive, and also relates to vehicles.

BACKGROUND ART

When an autonomous vehicle plans a new drive mission, first, a route from the departure point to the destination point is set, and then, the autonomous vehicle travels along the route. To set the route, a map capable of identifying at least an available area for driving the vehicle is required, and it is desirable that such a map has a higher accuracy. As an example of a technique for improving the accuracy of map, there has been proposed a technique in which attribute information (attribute map) indicating an attribute of each of multiple areas, which are obtained by dividing the surroundings of the vehicle, is created based on observation information and position information obtained by an image of the surroundings of the vehicle captured by a camera, to thereby calculate the reliability of attributes in each area, from multiple sets of attribute information corresponding to the same location. According to this technique, the reliability of attribute of an area is set to be greater, as the number of sets of information indicating the same attribute included in multiple sets of attribute information of the same area is greater.

CITATION LIST

Patent Literature

PTL 1: JP 2017-215940 A

SUMMARY OF INVENTION

Technical Problem

In recent years, autonomous vehicles are being used for industrial purposes. In confined areas for industrial use, such as container loading and unloading sites at wharves at ports, construction sites, and factory sites, areas available for driving vehicles change over time, because locations of containers or sand piles, for example, in the areas change over time. However, in the abovementioned conventional art, the reliability of attributes is calculated on the assumption that an object having the same attributes is typically present at the same location all the time. Thus, it is difficult to create an appropriate map in such an environment in which available areas for driving change over time, such as in a confined area for industrial use.

Therefore, an object of the present invention is to provide a method for mapping, a mapping device, a computer program, a computer readable medium, and a vehicle, capable of specifying an area available for driving an autonomous vehicle even in a confined area for industrial use.

Solution to Problem

According to the present invention, a map of a confined area, in which an autonomous vehicle drives, is created. That is, when the autonomous vehicle plans a new drive mission, a first set of environmental information, and after a time interval, a second set of environmental information, are obtained by a device flying above the confined area including the driving departure point and the driving destination point of the autonomous vehicle, each set of environmental information including locations and geometries of objects in the confined area. Then, an object that is present at the same location in the first set of environmental information and in the second set of environmental information is classified as a semi-static object, and an object that is present at different locations in the first set of environmental information and in the second set of environmental information is classified as a dynamic object. Then, a map including location and geometry of each object classified as a semi-static object, is created.

Advantageous Effects of Invention

According to the present invention, it is possible to specify an area available for driving an autonomous vehicle even in a confined area for industrial use.

DESCRIPTION OF EMBODIMENTS

Hereinbelow, embodiments of the present invention will be described in detail with reference to the accompanying drawings.

In an embodiment, there will be described a system capable of creating a map for use in setting of a driving route of an autonomous vehicle in a confined area for industrial use, and capable of having the autonomous vehicle travel along the route created based on the map. In the present embodiment, an example will be described in which a confined area for industrial use is a port area, where containers, and the like, are loaded and unloaded. As used herein, the term "autonomous vehicle" refers to both a vehicle that performs so-called, fully-automated driving control capable of unmanned driving, and a vehicle that performs automated driving control or driving assistance control, in manned driving.

Figure 1:
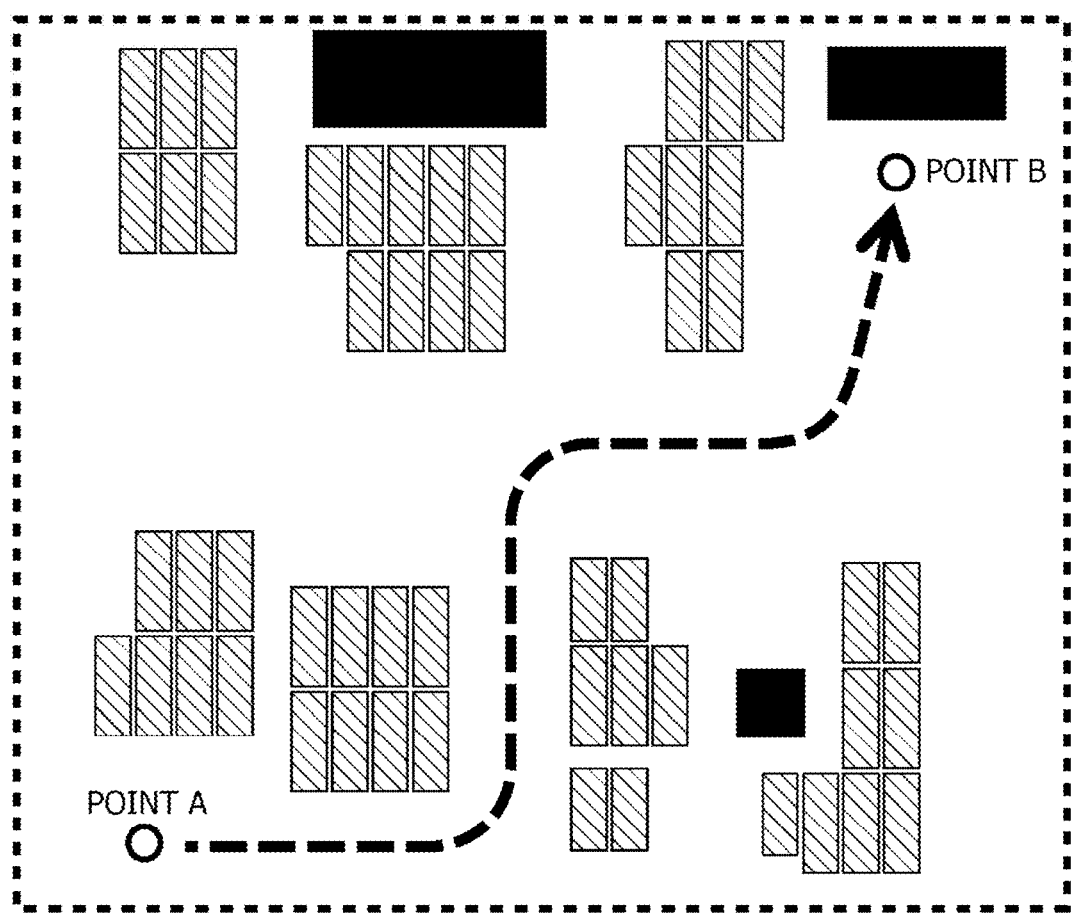
FIG. 1 is an explanatory view showing an example of a state of a confined area viewed from above.

First, an overview of the present embodiment will be described. FIG. 1 is an explanatory view showing locations and geometries of objects in a confined area at a timing, viewed from above. In FIG. 1, each square colored with a solid color, or black, indicates a building in the confined area, and each hatched square indicates cargo, such as a container. Here, a moving body, such as a vehicle, is omitted from FIG. 1. In the state shown in FIG. 1, when an autonomous vehicle moves from point A to point B, the autonomous vehicle can travel along a driving route indicated by a broken line, as long as no other vehicles, for example, hinder the traveling.

Figure 2:
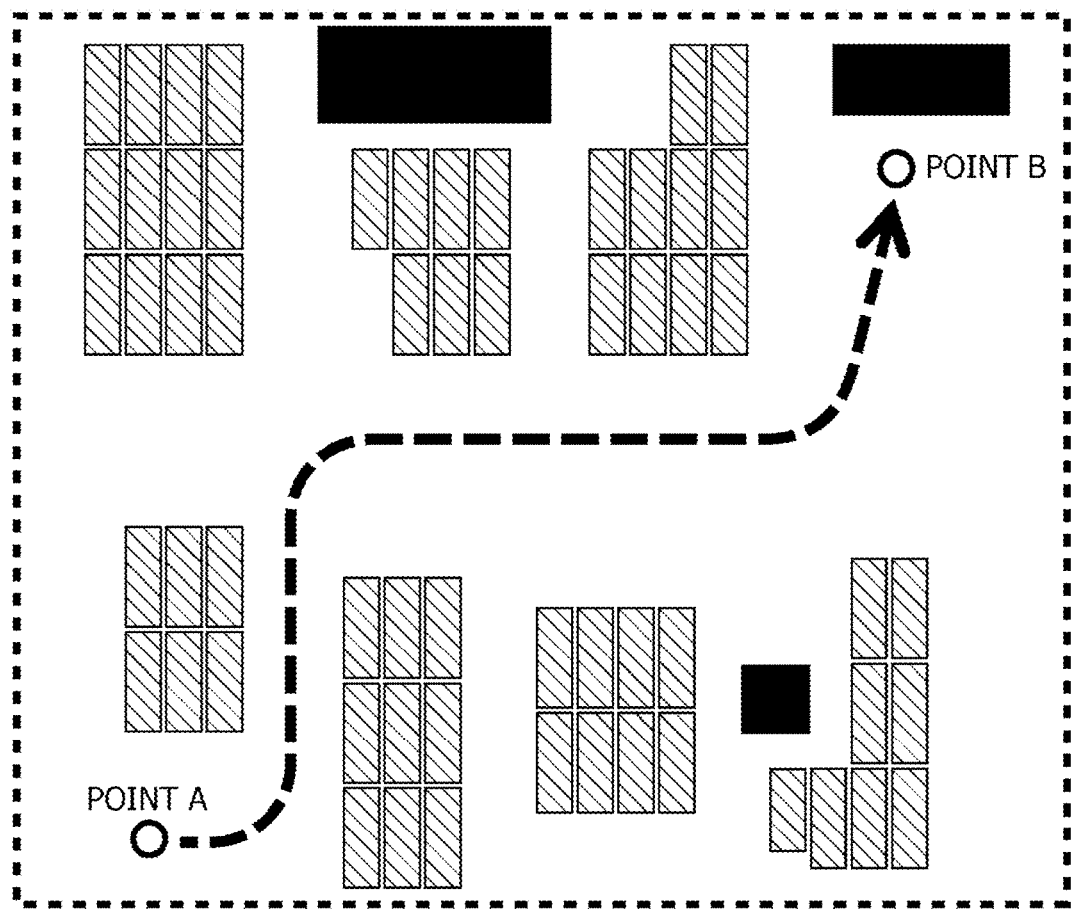
FIG. 2 is an explanatory view showing an example of another state of the confined area viewed from above.

On the other hand, FIG. 2 is an explanatory view, viewed from above, showing locations and geometries of objects in the confined area at a different timing from the timing of FIG. 1. Comparing FIGS. 1 and 2, some containers, or the like, are moved, so that an area in the confined area available for driving the vehicle changes. Thus, when moving from point A to point B in the confined area in FIG. 2, the autonomous vehicle cannot travel along the same driving route as found at the timing of FIG. 1.

Here, a driving route generated when an autonomous vehicle plans a new drive mission is based on a map of an area including the driving departure point and the driving destination point of the autonomous vehicle. Typically, for public roads, driving routes can be generated based on the same map any time, because available roads for vehicles do not change. However, in such an environment in which an available area for vehicles changes due to movements of containers, or the like, such as a confined area for industrial use, as shown in FIGS. 1 and 2, an appropriate driving route cannot be generated by a method similar to that for public roads. A technique for mapping, capable of generating an appropriate driving route, even in such an environment, will be described according to the present embodiment. Hereinafter, a map obtained by this mapping technique is referred to as a "dynamic map".

Figure 3:
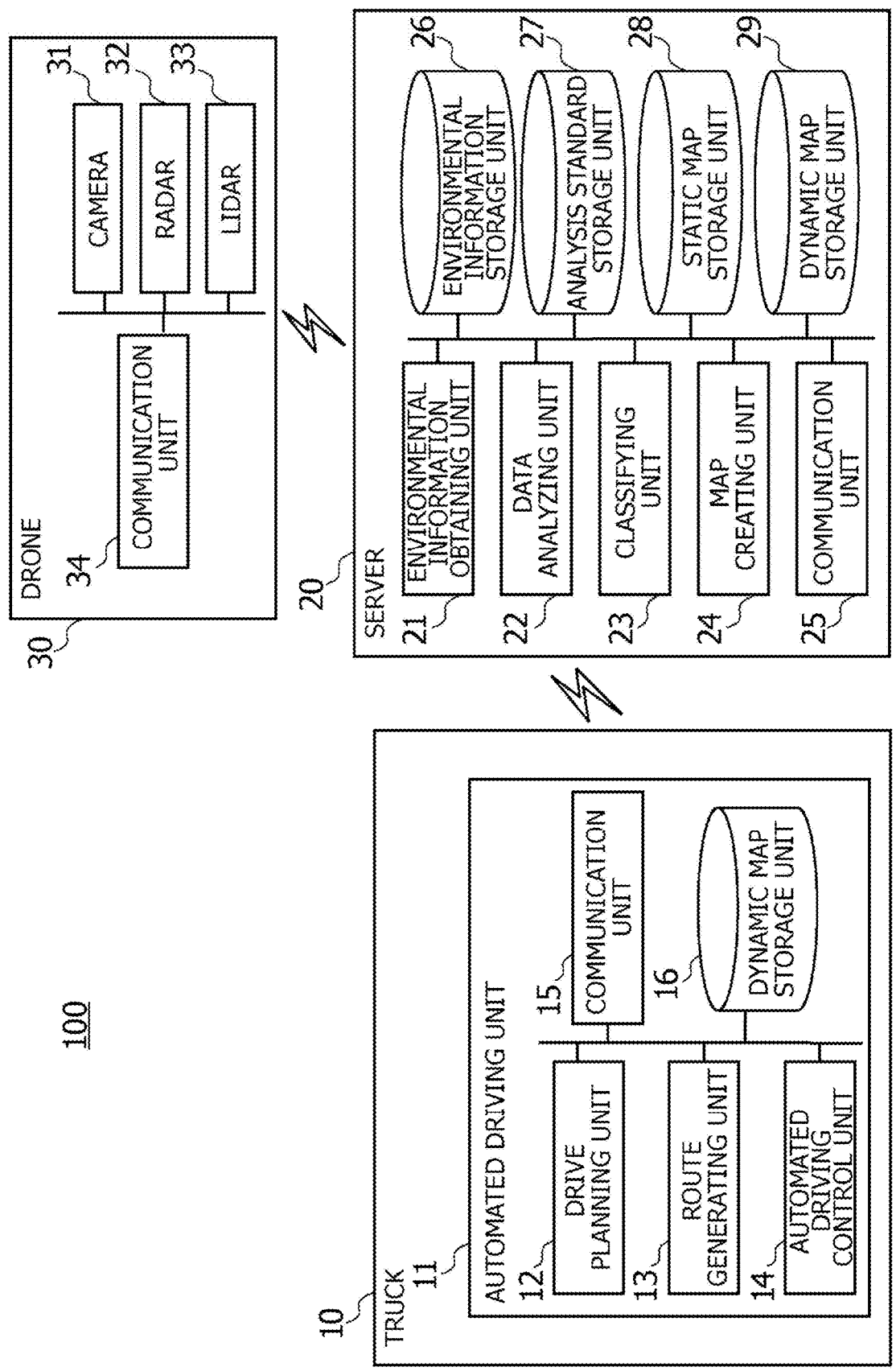
FIG. 3 is a block diagram showing an example of the overall configuration of a system.

FIG. 3 is a block diagram showing the overall configuration of a system 100 according to the present embodiment. The system 100 includes a truck 10, a server 20, and a drone 30.

The truck 10 is an example of an autonomous vehicle, and travels in the confined area to transport containers, or the like. In the present invention, the autonomous vehicle is not limited to a truck, but includes all types of vehicles that travels in the confined area, such as industrial vehicles including forklifts and towing vehicles, and construction vehicles.

The server 20 is a computer capable of communicating with the truck 10 and the drone 30, and creates a dynamic map indicating an available area for driving in the confined area at that time, in response to a request from the truck 10.

The drone 30 is an example of a device flying above the confined area, and obtains environmental information including information of objects in the confined area, from above the confined area. The information about objects includes locations and geometries (e.g., shapes and dimensions) of the objects.

The truck 10 includes an automated driving unit 11 that performs various controls related to the automated driving function. For example, the automated driving unit 11 is implemented in a preset electronic control unit (ECU) mounted in the truck 10. The automated driving unit 11 includes a drive planning unit 12, a route generating unit 13, an automated driving control unit 14, a communication unit 15, and a dynamic map storage unit 16.

The drive planning unit 12 receives, from an external system (not shown), a drive instruction specifying the departure point and the destination point, and plans a new drive mission based on the drive instruction. Then, the drive planning unit 12 provides the drive mission to the route generating unit 13.

The route generating unit 13 requests the server 20 for a dynamic map that indicates an available area for driving in the confined area at that time, and receives the dynamic map from the server 20. Then, the route generating unit 13 generates a driving route for the truck 10 from the departure point to the destination point based on the dynamic map.

The automated driving control unit 14 performs automated driving control such that the truck 10 travels along the driving route generated by the route generating unit 13. Specifically, the automated driving control unit 14 determines the traveling direction of the truck 10, while receiving the location of the truck 10 by GPS (Global Positioning System). Then, the automated driving control unit 14 outputs a control signal to the engine ECU to generate a wheel driving torque, and outputs a control signal to the steering ECU to perform steering control. Furthermore, the automated driving control unit 14 outputs a control signal to the braking ECU as necessary, for example, when the vehicle arrives at the destination point, or when various sensing devices mounted in the truck 10 detect an obstacle.

The communication unit 15 is a means for communicating with the truck 10 and the external, and performs modulation and demodulation of radio waves transmitted and received via an antenna. Wireless communication may be performed by a freely chosen method, such as standardized methods including various wireless local area networks (LANs) specified in IEEE (the Institute of Electrical and Electronics Engineers) 802.11, and other non-standardized methods. The truck 10 performs wireless communication with at least the external system, which provides a drive instruction, and the server 20.

The dynamic map storage unit 16 is a memory in which a dynamic map received from the server 20 is stored.

The server 20 includes an environmental information obtaining unit 21, a data analyzing unit 22, a classifying unit 23, a map creating unit 24, a communication unit 25, an environmental information storage unit 26, an analysis standard storage unit 27, a static map storage unit 28, and a dynamic map storage unit 29.

The environmental information obtaining unit 21 receives, from the truck 10, a request for a driving route, and transmits, to the drone 30, a request for environmental information of the confined area. Then, the environmental information obtaining unit 21 receives environmental information from the drone 30, and stores the environmental information in the environmental information storage unit 26.

The data analyzing unit 22 performs a preprocessing process and an analyzing process on the environmental information received from the drone 30, to detect objects in the confined area and to obtain information of the objects.

The classifying unit 23 classifies each detected object, and specifically, an object which does not move is classified as a "static object", an object which may move after a time period is classified as a "semi-static object", and an object which may move continuously is classified as a "dynamic object". In a port area, examples of static objects may include buildings, such as a management office, examples of semi-static objects may include cargo, such as a container, and examples of dynamic objects may include transport vehicles, such as a truck.

The map creating unit 24 creates a dynamic map including at least locations and geometries of semi-static objects, based on the object classification performed by the classifying unit 23.

The communication unit 25 is a means for communicating with the server 20 and the external, and performs modulation and demodulation of radio waves transmitted and received via an antenna, similarly to the communication unit 15 of the truck 10. Wireless communication may be performed by a freely chosen method, as described above. The server 20 performs wireless communication with at least the truck 10 and the drone 30.

The environmental information storage unit 26 is a memory in which environmental information received from the drone 30 is stored.

The analysis standard storage unit 27 is a memory in which various types of information, serving as standards used in analysis of environmental information performed in the data analyzing unit 22, are stored.

The static map storage unit 28 is a memory in which a static map is stored in advance. The static map records therein location and geometry of each static object in the confined area.

The dynamic map storage unit 29 is a memory in which a dynamic map created by the map creating unit 24 is stored.

The drone 30 includes sensing devices, such as a camera 31, a radar 32, and a lidar 33, and also includes a communication unit 34.

For example, the camera 31 may be a digital camera, which uses an image sensor, such as a CCD or a CMOS, or an infrared camera. The camera 31 may also be a stereo camera configured to obtain 3D stereo vision, or a ToF (Time-of-Flight) camera which is also known as a flash lidar. The camera 31 is mounted at a position capable of capturing an image of a view downward from the drone 30, and captures an image of an area including the confined area, from above.

The radar 32 is a device that uses electromagnetic waves, such as millimeter waves. The radar 32 is mounted at a position capable of emitting electromagnetic waves downward from the drone 30. The radar 32 emits electromagnetic waves, and senses reflected waves of the emitted electromagnetic waves reflected by objects on the ground, to detect locations, geometries, and the like, of the objects.

The lidar 33 is a device that uses pulse-like waves of laser light, which is a kind of electromagnetic radiation with a short-wavelength, such as ultraviolet light, visible light, and near-infrared light. The lidar 33 is mounted at a position capable of emitting electromagnetic waves downward from the drone 30. The lidar 33 emits electromagnetic waves, and senses reflected waves of the emitted electromagnetic waves reflected by objects, to detect locations, geometries, and the like, of the objects with high accuracy.

Specifically, in the present embodiment, the environmental information is at least one of image data captured by the camera 31, and point cloud data generated based on measurements of three-dimensional points based on reflected waves sensed by at least one of the radar 32 and the lidar 33.

The communication unit 34 is a means for communicating with the drone 30 and the external, and performs modulation and demodulation of radio waves transmitted and received via an antenna, similarly to the communication unit 15 of the truck 10. Wireless communication may be performed by a freely chosen method, as described above. The drone 30 performs wireless communication with at least the server 20.

Figure 4:
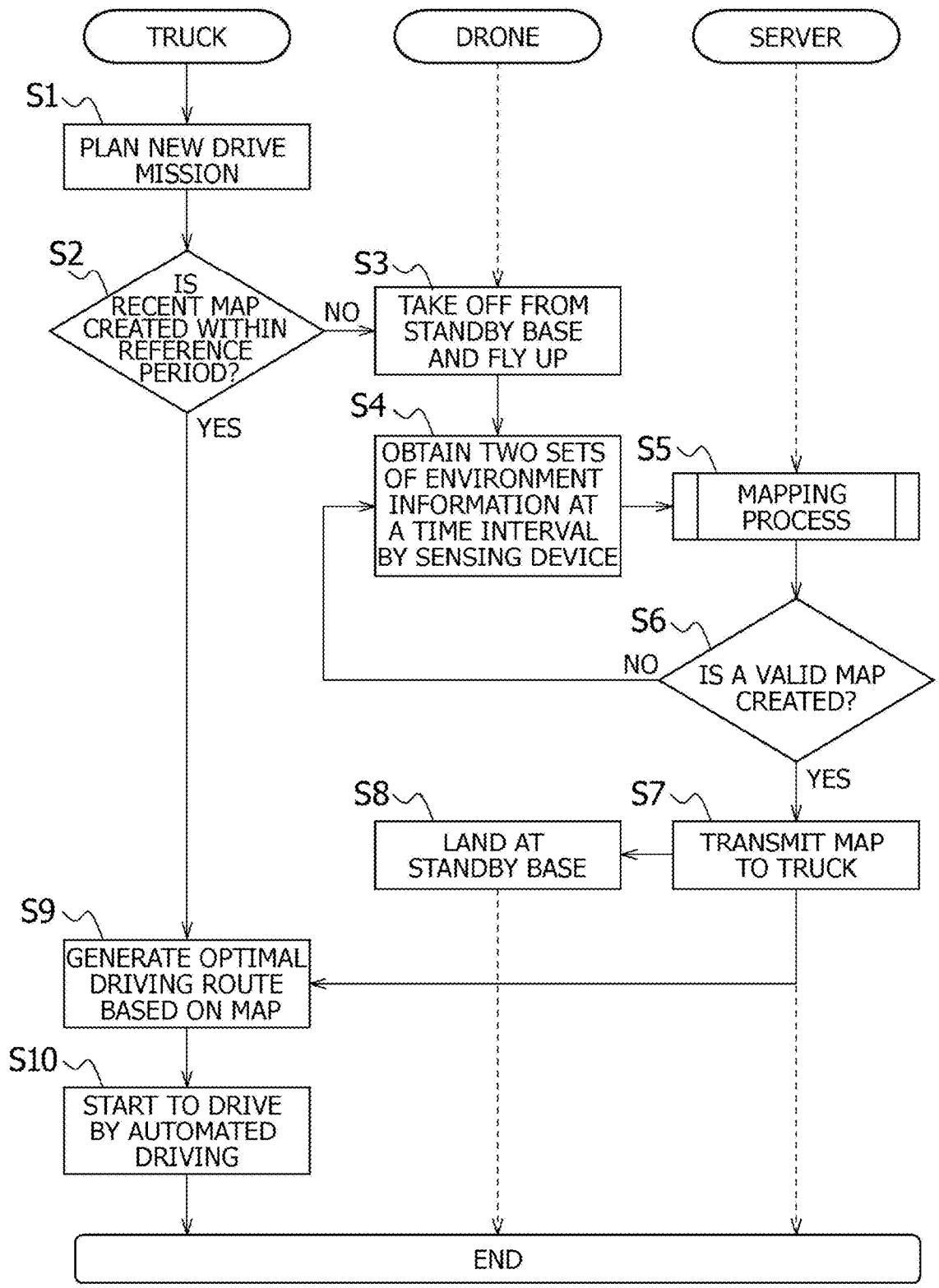
FIG. 4 is a flowchart showing an example of a process executed in the entire system.

FIG. 4 is a flowchart showing a process executed in the truck 10, the server 20, and the drone 30, of the system 100.

In step 1 (abbreviated as "S1" in the figure, the same applies to the following), the drive planning unit 12 of the truck 10 receives, from the external system, a drive instruction specifying the departure point and the destination point. Then, the drive planning unit 12 plans a new drive mission based on the drive instruction, and provides the drive mission to the route generating unit 13.

In step 2, the route generating unit 13 of the truck 10 refers to the dynamic map storage unit 16, and determines whether a recent dynamic map of the confined area is created within a reference period based on creation date and time of the recent dynamic map. Herein, the reference period is determined based on the movement frequencies of semi-static objects in the confined area. For example, when the confined area is a port area for loading and unloading containers, or the like, as in the present embodiment, semi-static objects may typically be containers. Thus, for example, in a case in which the average of time intervals at which a container in the confined area moves is 30 minutes, the reference period may be set to 30 minutes, and the route generating unit 13 may determine whether a recent dynamic map is created in last 30 minutes. If it is determined that the recent dynamic map is created within the reference period (Yes), the process proceeds to step 9; otherwise (No), the process proceeds to step 3.

In step 3, the drone 30 takes off from the standby base, and flies to a point in the sky, capable of viewing an area including the confined area. The drone 30 may fly autonomously to the point, or may fly by manual operation. More specifically, although not shown in the flowchart in FIG. 4, the truck 10 requests the server 20 to create a dynamic map, and the environmental information obtaining unit 21 of the server 20 transmits, to the drone 30, a signal requesting the drone 30 to obtain environmental information. In response to this signal, the drone 30 takes off from the standby base. Alternatively, the truck 10 may directly transmit, to the drone 30, a signal requesting the drone 30 to obtain environmental information.

In step 4, the drone 30 obtains environmental information of the area including the confined area by using at least one of the camera 31, the radar 32, and the lidar 33, each of which is a sensing device. Here, the drone 30 obtains two sets of environmental information at a time interval. Specifically, the drone 30 obtains a first set of environmental information, and after a time interval, a second set of environmental information. In the present embodiment, the time interval is assumed to be about several seconds, but this is not limited thereto. Furthermore, the number of times of obtaining environmental information is not limited to two, and may be any number as long as it is multiple. The drone 30 transmits the obtained two sets of environmental information to the server 20. Then, the environmental information obtaining unit 21 of the server 20 receives the two sets of environmental information from the drone 30.

In step 5, the data analyzing unit 22, the classifying unit 23 and the map creating unit 24 of the server 20 perform a mapping process for creating a dynamic map. Details of the mapping process will be described later.

In step 6, the map creating unit 24 of the server 20 determines whether a valid dynamic map is created. If it is determined that the valid dynamic map is created (Yes), the process proceeds to step 7; otherwise (No), the process returns to step 4.

In step 7, the map creating unit 24 of the server 20 stores the created dynamic map in the dynamic map storage unit 29, and also transmits the created dynamic map to the truck 10. At this time, information indicating creation date and time of the dynamic map is added to the dynamic map. Furthermore, the map creating unit 24 of the server 20 transmits, to the drone 30, an instruction to return to the standby base.

In step 8, the drone 30 lands at the standby base.

In step 9, the route generating unit 13 of the truck 10 stores the dynamic map received from the server 20, in the dynamic map storage unit 16, together with the information indicating the creation date and time of the dynamic map. Then, the route generating unit 13 generates an optimal driving route from the departure point to the destination point based on the dynamic map.

In step 10, the automated driving control unit 14 of the truck 10 performs automated driving control so that the truck 10 travels along the driving route generated by the route generating unit 13.

Figure 5:
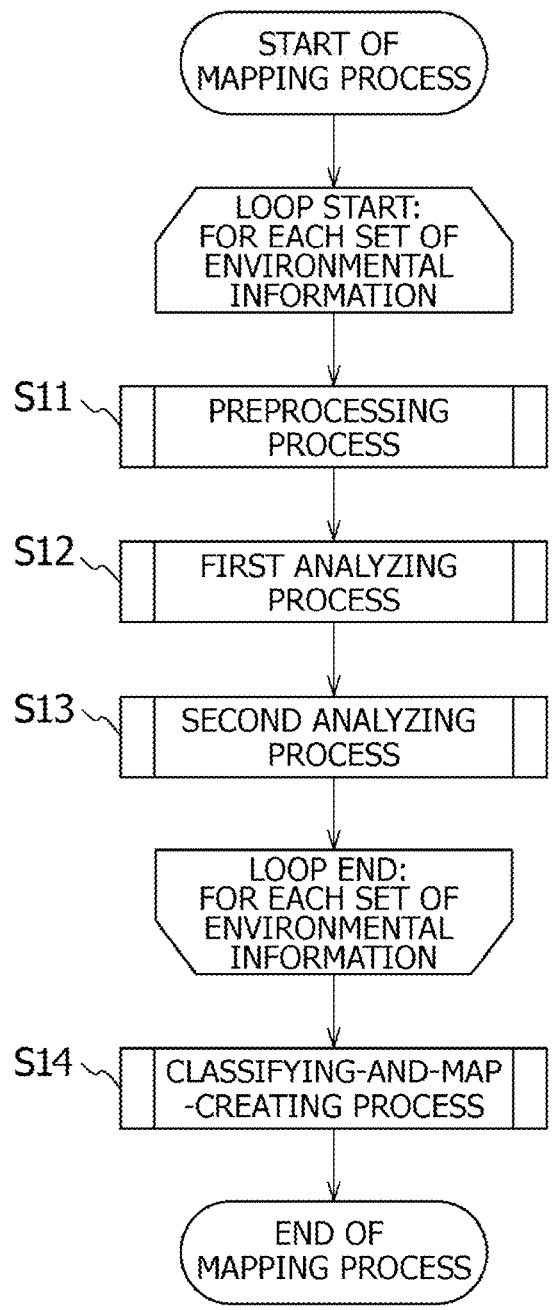
FIG. 5 is a flowchart showing an example of a mapping process.

FIG. 5 is a flowchart of the mapping process, which is executed by the data analyzing unit 22, the classifying unit 23, and the map creating unit 24 of the server 20.

Step 11 to step 13 are executed for each set of environmental information received from the drone 30.

In step 11, the data analyzing unit 22 performs a preprocessing process on environmental information to facilitate analysis.

In step 12, the data analyzing unit 22 executes a first analyzing process for detecting an object that may affect driving of the truck 10, based on height information of each object included in the environmental information.

In step 13, the data analyzing unit 22 executes a second analyzing process for detecting an object that may affect driving of the truck 10, based on geometry information of each object included in the environmental information.

In step 14, the classifying unit 23 and the map creating unit 24 execute a classifying-and-map-creating process based on the data analysis results of the environmental information. The classifying-and-map-creating process classifies each object in the confined area as a static object, a semi-static object, or a dynamic object, and creates a map of the environmental information.

Figure 6:
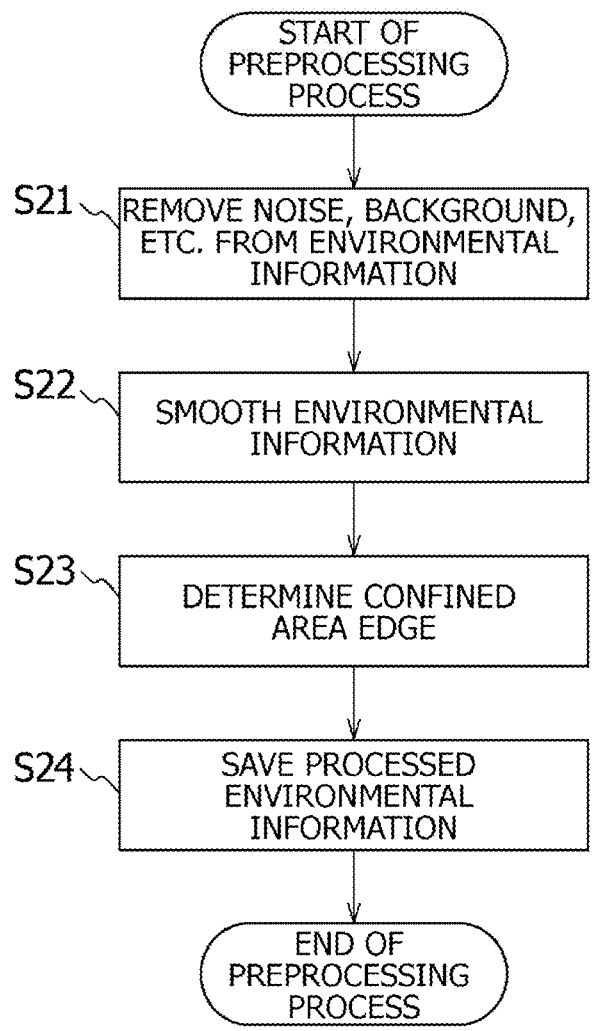
FIG. 6 is a flowchart showing an example of a preprocessing process.

FIG. 6 is a flowchart of the preprocessing process, which is executed by the data analyzing unit 22 of the server 20.

In step 21, the data analyzing unit 22 optionally removes noise, background, and the like, from environmental information received from the drone 30.

In step 22, the data analyzing unit 22 optionally performs a smoothing process on the environmental information.

In step 23, the data analyzing unit 22 determines the edge of the confined area, from the entire area indicated in the environmental information. For example, for an image captured by the camera 31, the edge of the confined area may be determined by storing, in advance, a pattern of objects present outside the edge of the confined area, and then, by matching the object pattern and objects in the entire image captured by the camera 31. For example, for point cloud data obtained by the radar 32 or the lidar 33, the edge of the confined area may be determined by storing, in advance, information of absolute coordinates (absolute location) of the confined area in the analysis standard storage unit 27, and by matching the coordinates of each point of the point cloud data and the absolute coordinates of the confined area. In the following processes, only environmental information that is inside the edge of the confined area is to be processed.

In step 24, the data analyzing unit 22 stores, in the environmental information storage unit 26, the environmental information processed in steps 21 to 23.

Figure 7:
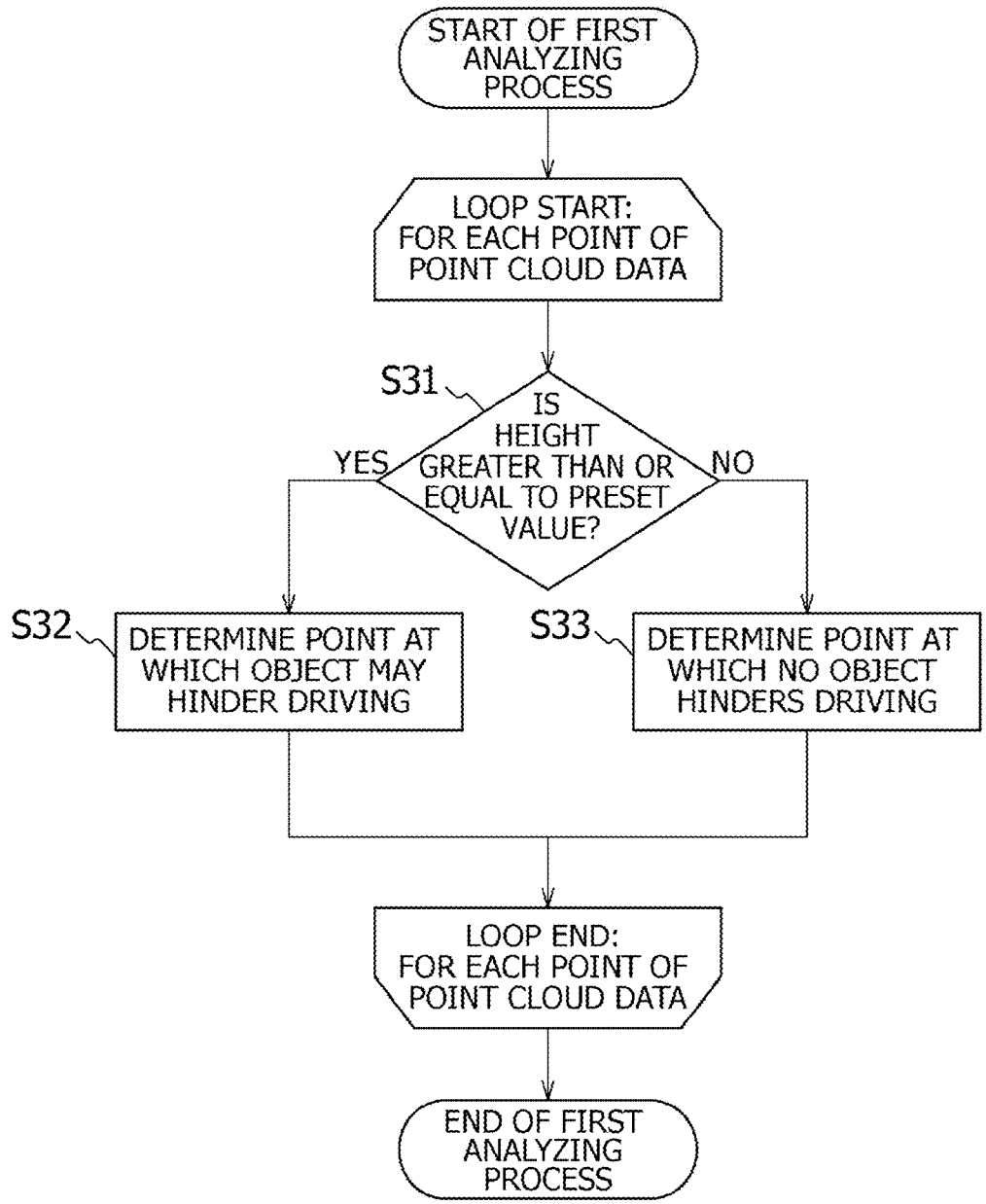
FIG. 7 is a flowchart showing an example of a first analyzing process.

FIG. 7 is a flowchart of the first analyzing process, which is executed by the data analyzing unit 22 of the server 20. The first analyzing process is typically performed on point cloud data obtained by the radar 32 and the lidar 33.

The following steps 31 to 33 are executed for each point of the point cloud data.

In step 31, the data analyzing unit 22 determines whether the height position of a point to be processed is greater than or equal to a preset value based on the coordinate information of the point. If it is determined that the height position of the point is greater than or equal to the preset value (Yes), the process proceeds to step 32; otherwise (No), the process proceeds to step 33.

In step 32, the data analyzing unit 22 determines that an object having a height that may hinder driving of the truck 10 is present at the location of the point, and records it in the environmental information storage unit 26.

In contrast, in step 33, the data analyzing unit 22 determines that there is no object having a height that may hinder driving of the truck 10, at the location of the point, and records it in the environmental information storage unit 26.

In this way, the first analyzing process determines points in the confined area, having heights that may hinder driving of the vehicle, based on the point cloud data obtained by the radar 32 or the lidar 33. Thus, it is possible to detect a hindering object located in the confined area.

Figure 8:
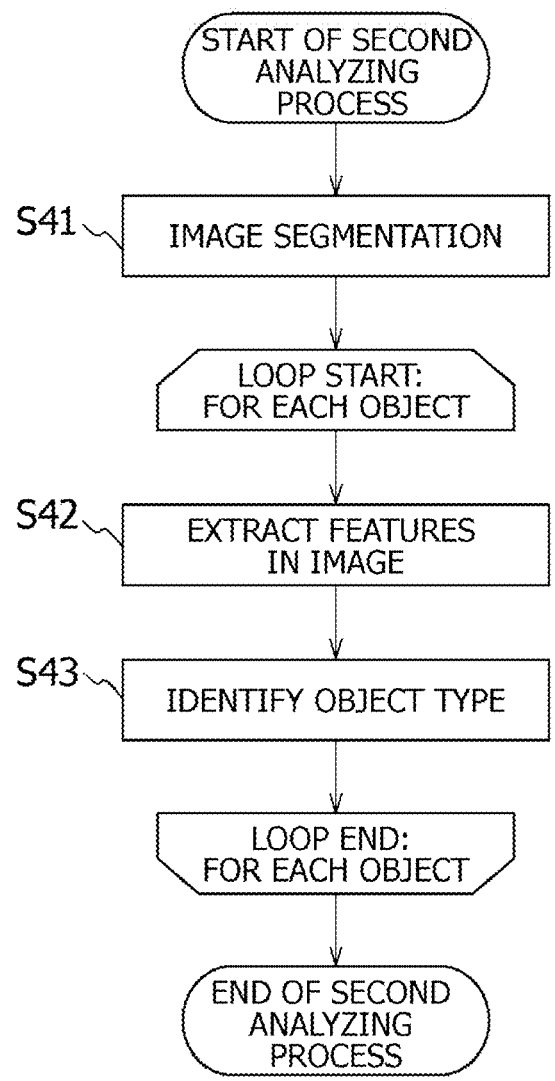
FIG. 8 is a flowchart showing an example of a second analyzing process.

FIG. 8 is a flowchart of the second analyzing process, which is executed by the data analyzing unit 22 of the server 20. The second analyzing process may be performed on both image data obtained by the camera 31, and point cloud data obtained by the radar 32 or the lidar 33.

In step 41, the data analyzing unit 22 performs segmentation on the environmental information, to detect objects indicated in the environmental information. For example, for image data, segmentation may be performed by a method using a luminance threshold, an edge determination method, or the like. For point cloud data, a process corresponding to the segmentation may be performed by determining points having heights greater than or equal to a preset value.

The following steps 42 and 43 are executed for each object detected by the segmentation.

In step 42, the data analyzing unit 22 extracts features of an object, such as shape, sizes, and colors, from the environmental information.

In step 43, the data analyzing unit 22 identifies the type of the object based on the extracted features, and records the identified type in the environmental information storage unit 26. For example, the type of the object may be identified by referring to information that associates features and types of objects and that is recorded in advance in the analysis standard storage unit 27, and by matching the recorded features and the extracted features of the object. At this time, for image data, matching of features may be performed based on two-dimensional information. This makes it possible to identify whether an object shown in an image is a container, a building, or a sign drawn on the ground, for example. For point cloud data, matching of features may be based on three-dimensional information.

In this way, the second analyzing process determines, even from image data, an area in the confined area, in which an object that may hinder driving of the vehicle is located, by detecting objects in the confined area based on the environmental information, and then, by identifying the type of each object. For example, in a case in which an object shown in the image is identified to be a container, the point in the confined area, at which the object is located, is determined to be a point where the vehicle cannot travel. In a case in which an object shown in the image is identified to be a sign drawn on the ground, the point in the confined area, at which the object is located, is determined to be a point where the vehicle can travel. Furthermore, for point cloud data, although it is possible to determine a point in the confined area, at which an object that may hinder driving of the vehicle is located, by the first analyzing process or by the second analyzing process, it is further possible to identify the type of each object by the second analyzing process.

Figure 9:
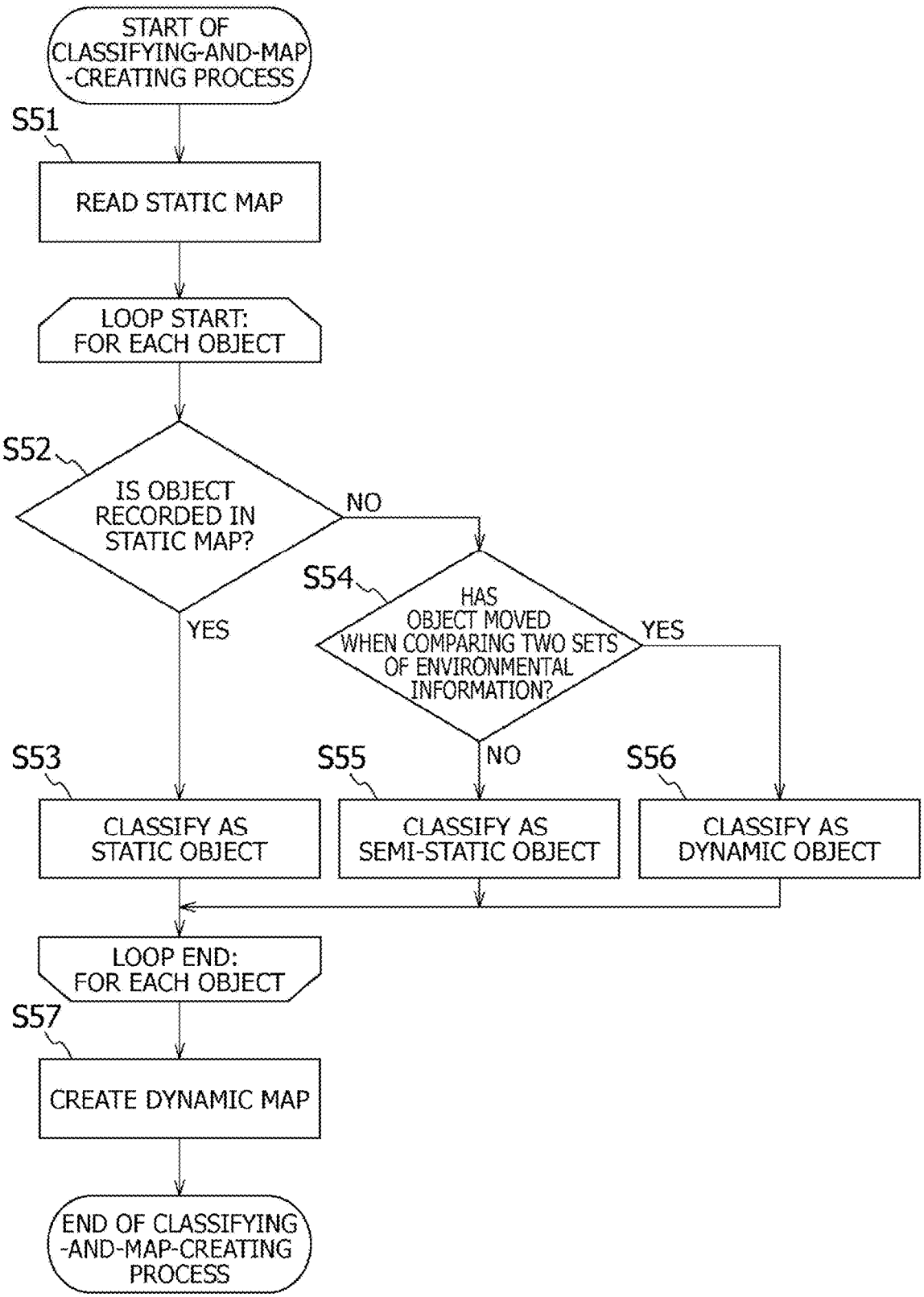
FIG. 9 is a flowchart showing an example of a classifying-and-map-creating process.

FIG. 9 is a flowchart of the classifying-and-map-creating process, which is executed by the classifying unit 23 and the map creating unit 24 of the server 20.

In step 51, the classifying unit 23 reads a static map stored in the static map storage unit 28.

The following steps 52 to 56 are executed for each object indicated in the environmental information. In steps 52 to 56, one of two sets of environmental information is processed as a target.

In step 52, the classifying unit 23 determines whether an object in the target environmental information is recorded in the static map. Specifically, the classifying unit 23 determines whether there is recorded in the static map an object having the same geometry at the same location as the object indicated in the target set of environmental information. If it is determined that such an object is recorded in the static map (Yes), the process proceeds to step 53; otherwise (No), the process proceeds to step 54.

In step 53, the classifying unit 23 classifies the object as a static object.

In step 54, the classifying unit 23 determines whether the object has moved by comparing the two sets of environmental information. Specifically, the classifying unit 23 compares two sets of environmental information and determines whether there is indicated, in the other set of environmental information, which is not a processing target, an object having the same geometry at the same location as the object in the target set of environmental information. Then, if both sets of environmental information indicate objects of the same geometry at the same location, the classifying unit 23 determines that the object has not moved, and otherwise determines that the object has moved. If it is determined that the object has not moved (No), the process proceeds to step 55; otherwise (Yes), the process proceeds to step 56. Although, it is assumed, in this embodiment, that the number of sets of environmental information are two, when the number of sets are three or more, the classifying unit 23 compares all sets of environmental information, and determines whether there is indicated, in each set of environmental information, which is not a processing target, an object having the same geometry at the same location as an object in the target set of environmental information. Then, if it is determined that all sets indicate objects of the same geometry at the same location, the process proceeds to step 55; otherwise, the process proceeds to step 56.

In step 55, the classifying unit 23 classifies the object as a semi-static object.

In step 56, the classifying unit 23 classifies the object as a dynamic object.

In step 57, based on the classification result of each object classified in steps 52 to 56, the map creating unit 24 creates a dynamic map including locations and geometries of objects classified as static objects and those of objects classified as semi-static objects. Specifically, the map creating unit 24 creates a dynamic map of the confined area based on location and geometry of each object included in the preprocessed environmental information stored in the environmental information storage unit 26. Here, although environmental information includes information of static, semi-static, and dynamic objects, a dynamic map of the present embodiment indicates only static and semi-static objects, because, by the time the truck 10 travels along the driving route after receiving the dynamic map, it is likely that dynamic objects have already moved. It should be noted that the truck 10 is provided with an on-board obstacle detection system for avoiding a collision between the truck 10 and a dynamic object.

Next, the classifying process of static, semi-static, and dynamic objects in steps 52 to 56, described above, will be described with a specific example.

Figure 10:
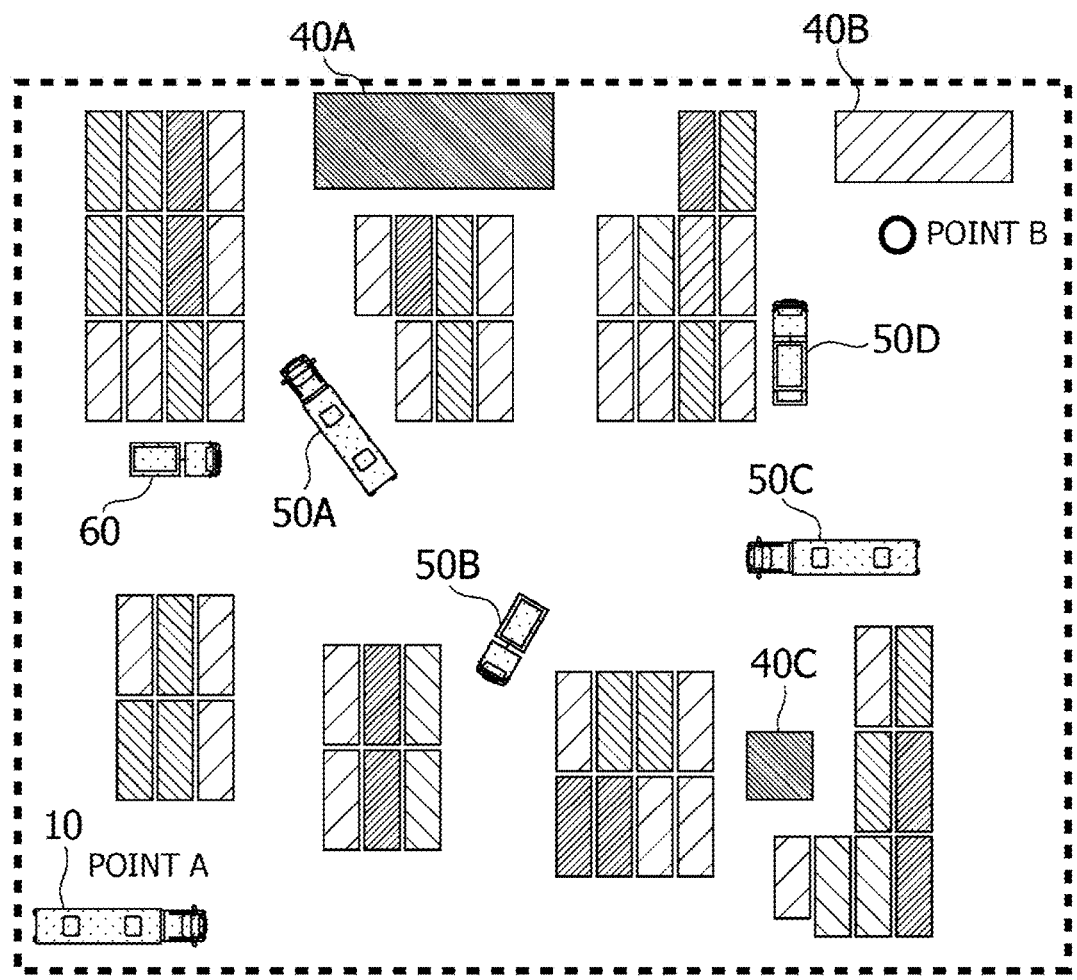
FIG. 10 is an explanatory view showing an example of a set of environmental information of the confined area.
Figure 11:
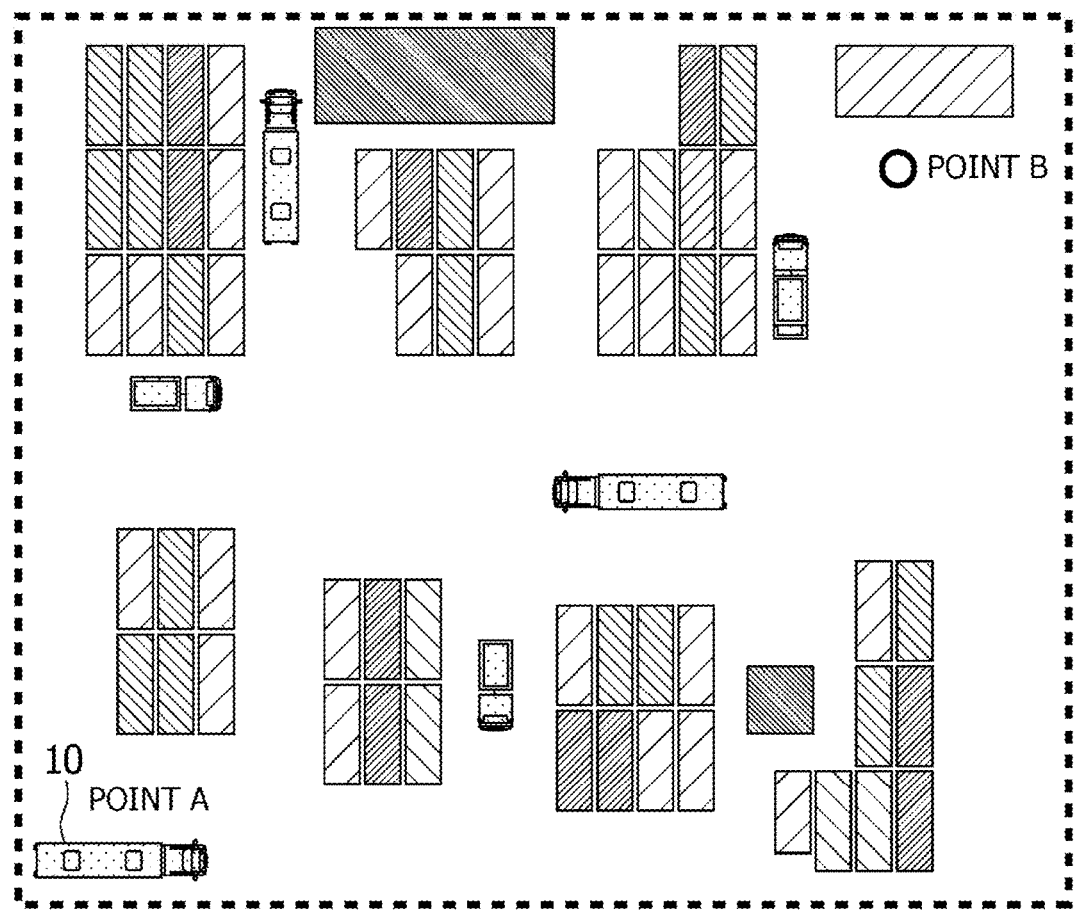
FIG. 11 is an explanatory view showing an example of another set of environmental information of the confined area.
Figure 12:
FIG. 12 is an explanatory view showing an example of a static map.

FIGS. 10 and 11 are explanatory views showing an example of obtained two sets of environmental information of the confined area including point A and point B, which are obtained by the drone 30 when a drive mission is planned. Here, point A, at which the truck 10 is located, is the driving departure point specified in the drive mission, and point B is the driving destination point specified in the drive mission. FIG. 10 shows a first set of environmental information, and FIG. 11 shows a second set of environmental information obtained after a time interval. Here, the two sets of environmental information shown in FIGS. 10 and 11 have been subjected to the preprocessing process, the first analyzing process, and the second analyzing process, so that all objects in the confined area have been detected, and the features (location and geometry) of each object have been extracted. FIG. 12 shows an example of the static map.

For each object indicated in the first set of environmental information in FIG. 10, the classifying unit 23 first refers to the static map shown in FIG. 12, and determines whether an object having the same geometry at the same location is recorded in the static map. Then, for each of objects 40A, 40B, and 40C, shown in FIG. 10, it is determined that an object having the same geometry at the same location is recorded in the static map, and thus, the objects 40A, 40B, and 40C are classified as static objects.

In addition, for the other objects indicated in the first environmental information in FIG. 10, which are not classified as static objects, the classifying unit 23 compares with objects indicated in the second set of environmental information in FIG. 11, and determines whether an object having the same geometry at the same location is indicated in the second set of environmental information. Then, for each of the objects 50A, 50B, 50C, and 50D, shown in the first set of environmental information in FIG. 10, it is determined that there is indicated no object having the same geometry at the same location in the second set of environmental information in FIG. 11, and thus, the objects 50A, 50B, 50C, and 50D are classified as dynamic objects. Then, the classifying unit 23 classifies the remaining objects as semi-static objects.

Figure 13:
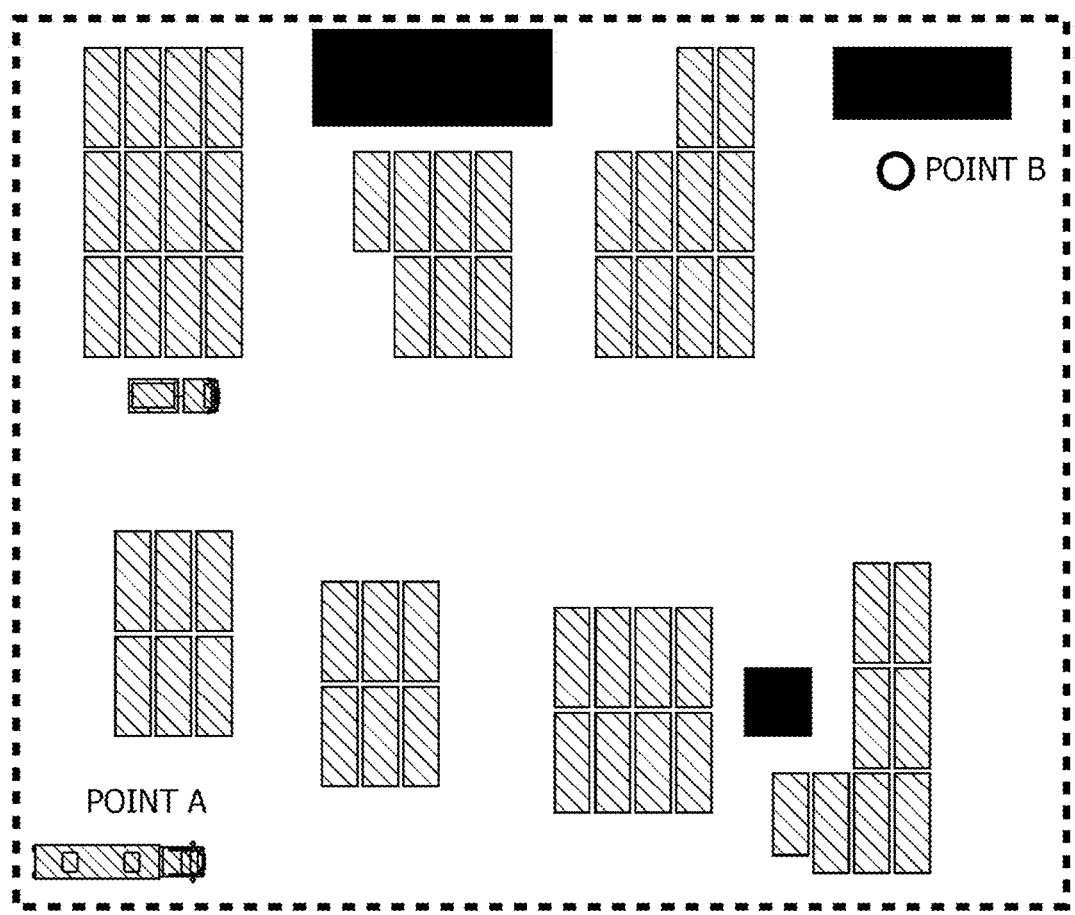
FIG. 13 is an explanatory view showing an example of a dynamic map.

FIG. 13 is an example of the dynamic map created by the map creating unit 24 based on the classification results. Here, the dynamic map does not indicate dynamic objects, that is, the objects 50A, 50B, 50C, and 50D. The objects 40A, 40B, and 40C, classified as static objects, are colored with a solid color, or are black, and the other objects, classified as semi-static objects, are hatched. The remaining area, where the vehicle can travel, are shown in white. Since such a dynamic map is created in the server 20, and then is transmitted to the truck 10, it is possible for the route generating unit 13 of the truck 10 to generate a driving route along which the truck 10 can move from point A to point B avoiding the static objects and the semi-static objects.

Here, the truck 10 is also classified as a semi-static object because it is in a stopped state when the two sets of environmental information are obtained. However, since the truck 10 obtains the own location information, it is possible for the route generating unit 13 of the truck 10 to identify that the semi-static object at the own location in the map is the truck 10.

According to the present embodiment, when the truck 10 plans a new drive mission (the truck 10 wants to start driving), all objects in the confined area for industrial use are classified as static objects, semi-static objects, or dynamic objects, and a dynamic map including locations and geometries of the static objects and the semi-static objects is created. By using the dynamic map, not only the locations of the static objects but also the locations of the semi-static objects, at the time when the truck 10 plans a new drive mission, can be specified, so that it is possible to specify an available area for driving the truck 10, even for the confined area where an available area for driving changes over time. Thus, by creating such a dynamic map, it is possible to generate an appropriate driving route for an autonomous vehicle in a confined area.

Furthermore, according to the present embodiment, the drone 30 flies to the sky and obtains multiple sets of environmental information and server 20 creates a dynamic map only when a recent dynamic map is not created within a reference period determined based on the movement frequencies of semi-static objects. Thus, it is possible to prevent creation of an unnecessary map, resulting in a reduced processing load of the entire system.

Furthermore, there may be a case in which semi-static objects in the confined area have different movement frequencies depending on types (for example, containers or other large cargos) of the semi-static objects. Thus, the reference period may be determined based on a highest movement frequency (i.e., a shortest moving distance) obtained for each type of semi-static object in the confined area.

Figure 14:
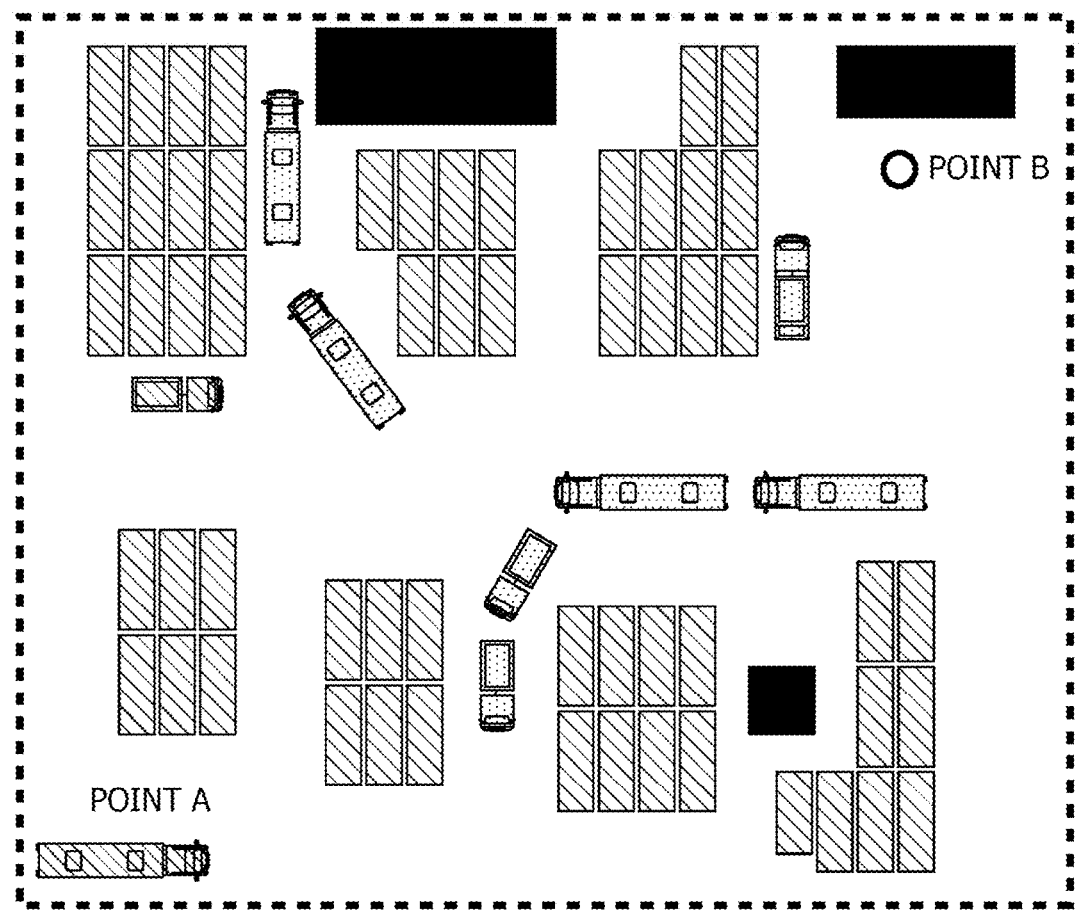
FIG. 14 is an explanatory view showing another example of the dynamic map.

Although FIG. 13 shows an example of the dynamic map created by the map creating unit 24 based on the classification results by the classifying unit 23, the map creating unit 23 may further include, in the dynamic map, location and geometry of each object classified as a dynamic object, as shown in FIG. 14, which shows another example of the dynamic map. At this time, the dynamic map may indicate a dynamic object indicated in either one of the two sets of environmental information, or may indicate dynamic objects indicated in both sets of environmental information, as shown in FIG. 14. Although, unlike a static object and a semi-static object, a point at which a dynamic object is present is likely to be available for driving at the time when the truck 10 drives through the point, a probability that another dynamic object, such as another transport vehicle travelling along the same driving route, will be at the same point, is relatively high. Thus, by indicating, in the dynamic map, a point at which dynamic object was present, it is possible to generate a driving route that avoids the point as much as possible.

Figure 15:
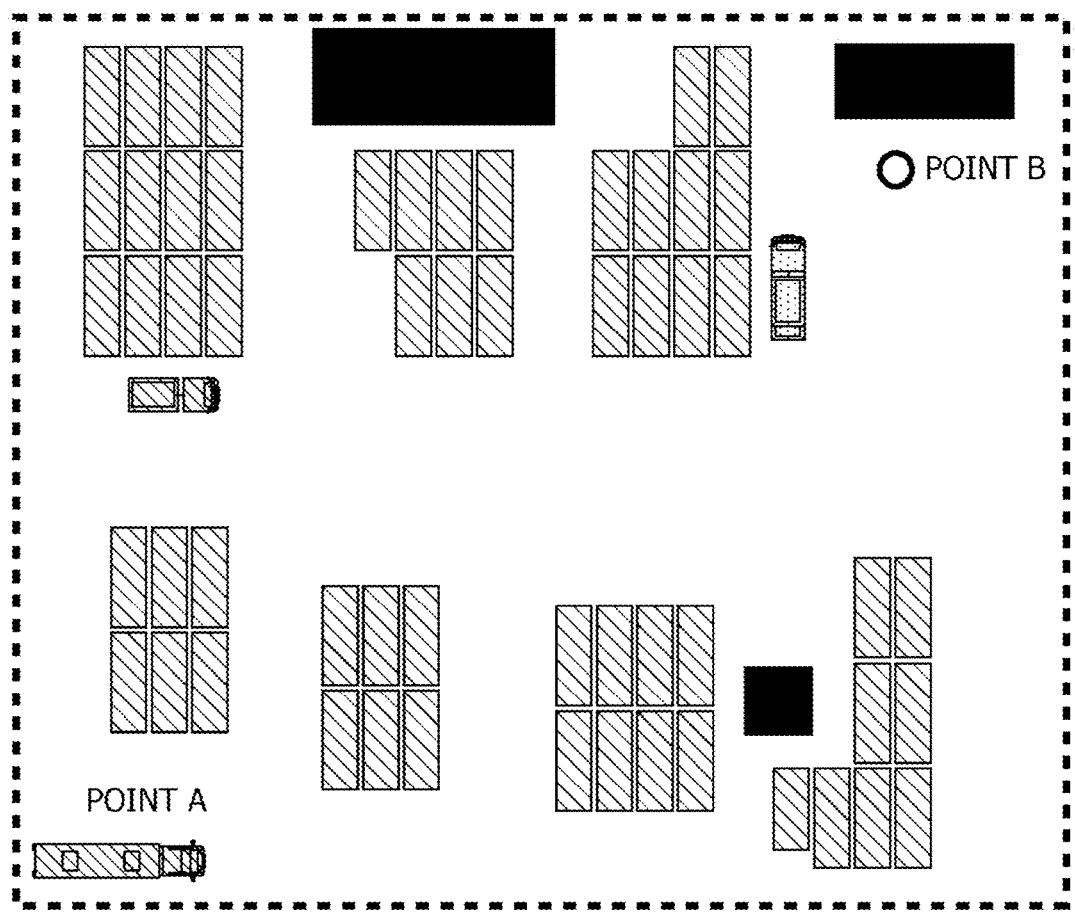
FIG. 15 is an explanatory view showing another example of the dynamic map.

In addition, when creating such a dynamic map that also indicates a dynamic object, only a dynamic object having a small moving distance when comparing two sets of environmental information, such as object 50D in FIG. 10, may be indicated in the dynamic map, as shown in FIG. 15, instead of indicating all the dynamic objects. Specifically, for an object indicated in the first set of environmental information in FIG. 10, when no object having the same geometry at the same location is indicated in the second set of environmental information in FIG. 11, the classifying unit 23 may determine whether an object having the same geometry is present within a preset distance from the object. In other words, the classifying unit 23 determines whether the moving distance of the object, obtained by comparing the first set of environmental information in FIG. 10 and the second set of environmental information in FIG. 11, is less than or equal to a preset value. Then, the map creating unit 24 may further indicates, in the dynamic map, such a dynamic object that satisfies this condition. Thus, when generating a driving route of the truck 10, it is possible to generate a driving route avoiding a slowly moving dynamic object as much as possible, since such a dynamic object may be likely to hinder driving of the truck 10.

To make static objects, semi-static objects, and dynamic objects distinguishable in a dynamic map, static objects, semi-static objects, and dynamic objects may be depicted in different colors or patterns, for example, as shown in FIGS. 13 to 15. Alternatively, as another example, layers may be used to create a dynamic map, and static objects, semi-static objects, and dynamic objects may be depicted on different layers.

Furthermore, although classification as a static object is performed by referring to the static map in the present embodiment, the present invention is not limited thereto, and classification as a static object may be omitted. That is, both static objects and semi-static objects may be treated as objects that have not moved when comparing two sets of environmental information, and a dynamic map may be created by merely distinguishing between these objects and dynamic objects.

Furthermore, when classifying an object between a semi-static object and a dynamic object, the classifying unit 23 may specify the type of object (for example, a container or a transport vehicle). For specifying types, the processing results of step 43, described above, may be used. Then, when classifying an object between a semi-static object or a dynamic object, the classifying unit 23 refers to information stored, in advance, in the analysis standard storage unit 27, and indicating whether the type of each object corresponds to a semi-static object or a dynamic object, and the classifying unit 23 determines whether a type of an object that is present at the same location in multiple sets of the environmental information, that is, an object that should be classified as a semi-static object, corresponds to a dynamic object. Then, when the object satisfies this condition, the map creating unit 24 may create a dynamic map to which added a notice indicating that there is a possibility that the object will move. For example, an object 60 indicated in the first set of environmental information in FIG. 10 did not move when comparing FIGS. 10 and 11, and thus, the object 60 is classified as a semi-static object according to the abovementioned process. However, the type of the object 60 is actually a transport vehicle, and the object 60 should be typically classified as a dynamic object. In such a case, the map creating unit 24 may add a notice indicating this to the dynamic map.

Figure 16:
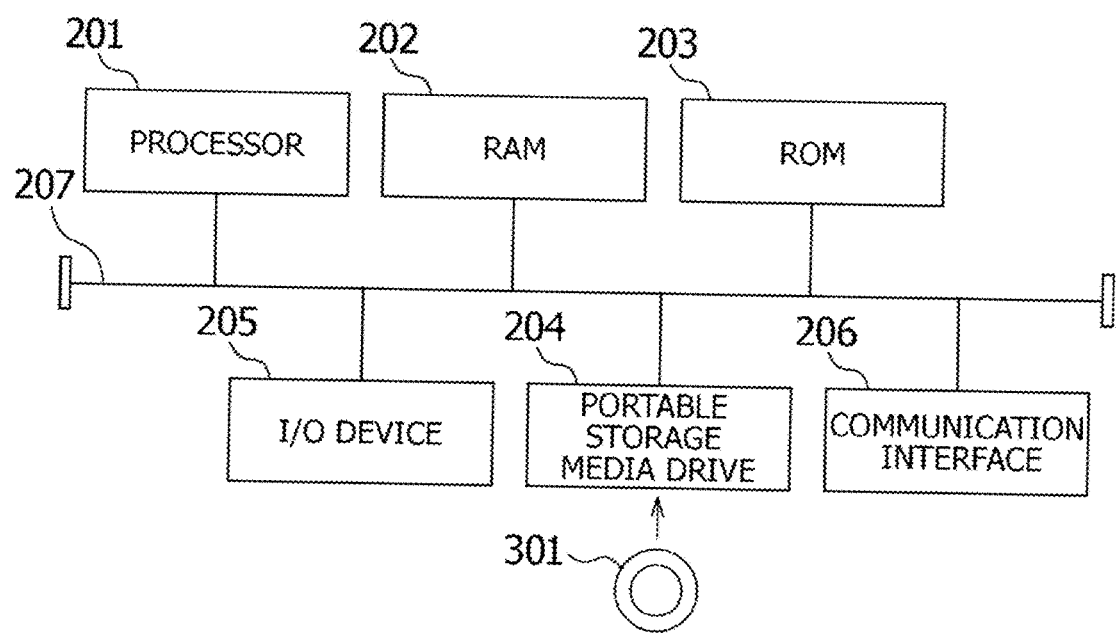
FIG. 16 is an explanatory view showing an example of a configuration of a hardware of a computer.

FIG. 16 is an explanatory view showing an example of a configuration of a hardware of a computer in the server 20. The computer includes a processor 201, a RAM 202, a ROM 203, a portable storage medium drive 204, an input/output device 205, and a communication interface 206.

The processor 201 includes a control unit, a computing unit, an instruction decoder, and the like. The processor 201 executes arithmetic and logic operations using the computing unit in response to a control signal output from the control unit according to an instruction of a program decoded by the instruction decoder. The processor 201 includes, for example, a control register that stores therein various information for use in control, and a cache that is capable of temporarily storing contents of the RAM 202, and the like, which have already been accessed.

The RAM 202 includes, for example, a DRAM and an SRAM, which are volatile memories in which data is lost when the power supply is interrupted. A program is loaded to the RAM 202, and temporary data for processing the processor 201 is stored in the RAM 202. The ROM 203 includes, for example, a hard disk drive (HDD), and a flash memory, which are electrically rewritable nonvolatile memories. The ROM 203 stores programs and various types of data. The portable storage medium drive 204 is a device that reads out data and programs stored in a portable storage medium 301. The portable storage medium 301 includes, for example, a magnetic disk, an optical disk, a magneto-optical disk, a flash memory. The processor 201 executes a program stored in the ROM 203 or the portable storage medium 301, while cooperating with the RAM 202 or the ROM 203. The program executed by the processor 201 and data to be accessed may be stored in another device that is capable of communicating with the computer.

The input/output device 205 is, for example, a keyboard, a touchscreen, a display, or the like. The input/output device 205 receives operating instruction from user operation, or the like, and outputs processing results of the computer.

The communication interface 206 may include, for example, a radio frequency receiver and a radio frequency transmitter, and an optical receiver and an optical transmitter, in addition to a LAN card or the like.

These components of the computer are connected by a bus 207.

The ECU in which the automated driving unit 11 of the truck 10 is mounted also includes at least components similar to the processor 201, the RAM 202, and the ROM 203, described above. In the truck 10, communication with other ECUs and onboard devices is performed by, for example, controller area network (CAN), local in-terconnect network (LIN), Ethernet (registered trademark), and FlexRay. Thus, the communication interface provided in the ECU includes a CAN transceiver, or the like, connected to the onboard network.

In this embodiment, the server 20 includes the environmental information obtaining unit 21, the data analyzing unit 22, the classifying unit 23, the map creating unit 24, the environmental information storage unit 26, the analysis standard storage unit 27, the static map storage unit 28, and the dynamic map storage unit 29, and the server 20 executes the mapping process. However, the device for executing the mapping process is not limited to the server 20. For example, these components may be provided in the truck 10, and the truck 10 may execute the mapping process.

One skilled in the art would readily understand that a new embodiment can be made by omitting a part of the technical idea of the various embodiments, freely combining parts of the technical idea of the various embodiments, and substituting a part of the technical idea of the various embodiments with a known technique.

REFERENCE SIGNS LIST

10 Truck
20 Server
30 Drone
12 Drive planning unit
13 Route generating unit
14 Automated driving control unit
16 Dynamic map storage unit
21 Environmental information obtaining unit
22 Data analyzing unit
23 Classifying unit
24 Map creating unit
26 Environmental information storage unit
27 Analysis standard storage unit
28 Static map storage unit
29 Dynamic map storage unit
31 Camera
32 Radar
33 Lidar

The invention claimed is:
1. A method for mapping a confined area in which an autonomous vehicle drives, the method comprising the steps of:
obtaining, by an environmental information obtaining unit, when the autonomous vehicle plans a new drive mission, a first set of environmental information, and after a time interval, a second set of environmental information, by a device flying above the confined area including the driving departure point and the driving destination point of the autonomous vehicle, each set of environmental information including locations and geometries of objects in the confined area;
classifying, by a classifying unit, an object that is present at different locations in the first set of environmental information and in the second set of environmental information as a dynamic object;
classifying, by the classifying unit, an object that is present at a same location during the time interval in the first set of environmental information and in the second set of environmental information but will move after the time interval as a semi-static object;
creating, by a map creating unit, a map including location and geometry of each object classified as semi-static, and wherein the created map is a dynamic map and is created only when a recent dynamic map is not created within a reference time period determined depending on a movement frequency of any one of the objects classified as semi-static, wherein the movement frequency is referred to a time period after which an object classified as semi-static will move; and
controlling the autonomous vehicle based on the map.
2. The method for mapping according to claim 1, wherein the step of obtaining first and second sets of environmental information is performed only when a recent map is not created within the reference time.

3. The method for mapping according to claim 2, wherein the reference time period is determined based on a highest movement frequency obtained for each type of semi-static object in the confined area.

4. The method for mapping according to claim 1, wherein the map further includes location and geometry of each object classified as a dynamic object.

5. The method for mapping according to claim 4, wherein the map further includes location and geometry of only the object classified as the dynamic object moving a distance less than or equal to a predetermined value in the first set of environmental information and in the second set of environmental information.

6. The method for mapping according to claim 1, wherein the classifying step:
  identifies a type of each object based on features of each object;
  refers to information indicating whether the type of each object corresponds to semi-static or a dynamic; and
  determines whether the type of an object that is present at the same location in the first set of environmental information and in the second set of environmental information corresponds to dynamic, and
  when it is determined that the type of the object that is present at the same location in the first set of environmental information and in the second set of environmental information corresponds to a dynamic object, the creating step creates the map to which added a notice indicating that there is a possibility that the object will move.

7. The method for mapping according to claim 1, wherein the classifying step refers to a static map in which location and geometry of a static object, which does not move, is recorded in advance, and classifies, among the objects in the first and second sets of environmental information, an object which is recorded in the static map, as static.

8. The method for mapping according to claim 1, wherein the step of obtaining first and second sets of environmental information obtains the first and second sets of environmental information by at least one of a camera, a radar, and a lidar.

9. A mapping device configured to perform the method for mapping according to claim 1.

10. A vehicle equipped with the mapping device according to claim 9.

11. A non-transitory computer readable medium storing a computer program comprising instructions, which when executed by a processor, cause the processor to perform the method of mapping according to claim 1.

* * * * *